(12) United States Patent
Jankowski et al.

(10) Patent No.: US 6,305,909 B1
(45) Date of Patent: Oct. 23, 2001

(54) ENGINE ARRANGEMENT FOR BLOWERS AND BLOWER/VACUUMS

(75) Inventors: Mark Jankowski, Phoenix; Clyde J. Smith, Chandler, both of AZ (US)

(73) Assignee: MTD Southwest Inc., Chandler, AZ (US)

( * ) Notice: Subject to any disclaimer, the term of this patent is extended or adjusted under 35 U.S.C. 154(b) by 0 days.

(21) Appl. No.: 09/514,043

(22) Filed: Feb. 25, 2000

(51) Int. Cl.[7] .................................................. F04B 53/00
(52) U.S. Cl. ........................................... 417/234; 417/364
(58) Field of Search ................................... 417/234, 364

(56) References Cited

U.S. PATENT DOCUMENTS

| | | | |
|---|---|---|---|
| Re. 33,050 | * 9/1989 | Tuggle et al. ............................ | 15/330 |
| 1,583,528 | 5/1926 | Clements . | |
| 4,288,886 | 9/1981 | Siegler . | |
| 4,325,163 | * 4/1982 | Mattson et al. ......................... | 15/330 |
| 4,723,893 | 2/1988 | Kiyooka et al. . | |
| 4,870,714 | 10/1989 | Miner . | |
| 5,222,275 | 6/1993 | Baker et al. . | |
| 5,233,946 | 8/1993 | Yamami . | |
| 6,007,304 | * 12/1999 | Veser ....................................... | 417/234 |

OTHER PUBLICATIONS

McCulloch Catalog, 1996.

* cited by examiner

Primary Examiner—Charles G. Freay
Assistant Examiner—Ed Hayes
(74) Attorney, Agent, or Firm—Brooks & Kushman P.C.

(57) ABSTRACT

A Compact blower is provided having a housing defining an engine compartment, cooling air compartment and a volute chamber all coaxially aligned along a vertical axis. An internal combustion engine is oriented within the engine compartment with a vertically aligned output shaft and a forwardly facing fin cylinder. The rotary impeller is affixed to the engine output shaft provided with a plurality of cooling air pump blades projecting upward from a circular disc and oriented within the cooling air pump compartment. The impeller is further provided with a plurality of blower fan blades which project outwardly into the volute chamber. The rotation of the impeller causes air to be drawn into the volute chamber and discharged through the blower air discharge port. Cooling air is drawn through the cooling air pump compartment and directed across the engine and cylinder and ultimately discharged through an upper front portion of the engine compartment in a direction away from the operator.

10 Claims, 4 Drawing Sheets

ENGINE ARRANGEMENT FOR BLOWERS AND BLOWER/VACUUMS

TECHNICAL FIELD

The present invention relates to hand-held operated carried blowers for lawn garden use and blowers which can be alternatively used in a vacuum mode for collecting debris.

BACKGROUND ART

Blowers for lawn and garden use which are portable and hand-held by an operator when in use are well known and are made by a number of different companies. Blowers can be powered by electric motors as illustrated in U.S. Pat. No. 5,222,275 or by small spark ignition internal combustion engines as illustrated in U.S. Pat. No. 4,674,146. These two patents describe blowers which can be converted between a blower mode for blowing leaves or the like and a vacuum mode where debris is collected via a vacuum tube and contained within an operator carried bag. The problems associated with blower/vacuums, particularly those powered by internal combustion engines are that the overall height of the apparatus becomes cumbersome and the engine cooling air and/or the engine exhaust is frequently directed into the operator in at least one of the two modes of operation.

The problems sought to be remedied by the present invention is to provide a compact blower vacuum unit which directs engine exhaust and engine cooling air comfortably away from the operator in both the vacuum and blower operation mode.

DISCLOSURE OF INVENTION

Accordingly, the present invention provides a portable hand-held operator carried blowers and preferably to blower/vacuums that can be alternatively used in the blower and vacuum mode. The blower vacuum is made up of a housing which aligned along a generally vertical central axis defining a generally axially aligned engine compartment, cooling air pump compartment, and volute chamber therein. The engine compartment is provided with a cooling air discharge port formed in an upper forward region thereof. The cooling compartment is located below the engine compartment and is provided with a circumaxial wall extending about the central axis and a separator wall between the engine compartment and the cooling air pump compartment. The volute chamber is located below the cooling air pump compartment and is provided with an axially aligned central air inlet and a blower air discharge port oriented in the forward direction generally normal to the central axis. An internal combustion engine falls within the engine compartment has an input shaft extending downwardly and a finned cylinder extending outward from the central axis in a forward direction within the engine compartment. A rotary impeller is connected to the internal combustion engine input shaft, the impeller is provided with a plurality of cooling air pump blades which project upwardly from a central disc which acts as a boundary between the cooling air pump compartment and the volute chamber. A plurality of blower fan blades project downwardly from the circular disc into the volute chamber. As the engine rotates the rotary impeller, the cooling air pump blades draw air into the cooling air pump compartment and discharge pressurized air through the cooling air outlet into the engine compartment where the air flows across the fin cylinder is ultimately exhausted through the cooling air discharge port in a direction away from the operator.

The present invention associating the cooling air pump compartment immediately adjacent the volute chamber enables a single rotary impeller assembly to be utilized providing efficient use of axial space by interposing a fly wheel and associated engine starter mechanism on the engine output shaft between the rotary impeller and the engine block enables a cantilevered crank type design engine to be utilized further facilitating an axially compact squatty shaped blower vacuum resulting in an excellent feel and ergonomic performance.

These and other advantages of the present invention become apparent upon review of the attached drawings.

BEST MODE FOR CARRYING OUT THE INVENTION

Figure 1:
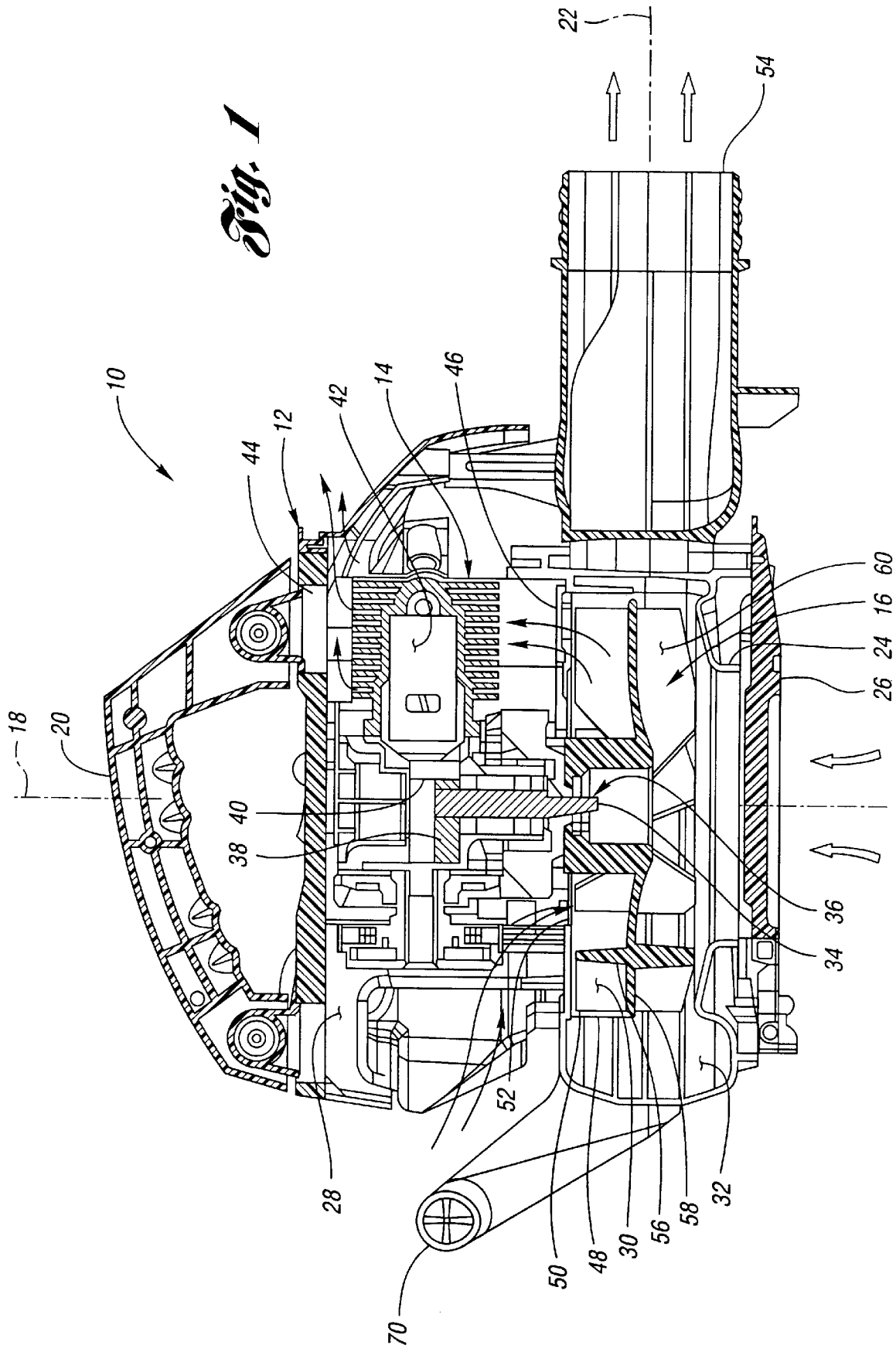
FIG. 1 is a side cross-sectional elevational view of the blower vacuum of the present invention.

Referring to FIG. 1, a blower vacuum 10 is illustrated in cross-sectional view. A blower vacuum is made up of three main components; a housing 12, an internal combustion engine 14 and a rotary impeller 16. Housing 12 is aligned along a generally vertical central axis 18, the handle 20 is at the upward portion of the housing 12. Handle 20 lies in a longitudinal axis 22. A lower surface of the housing has a blower air inlet 24 which in the blower mode illustrated is covered by a hinged cover 26 of conventional design which in our blower air inlet 24 while large objects such as stone, sticks or an operator's fingers.

Housing 12 defines three internal compartments; an engine compartment 28, a cooling air pump compartment 30 and a volute chamber 32. Internal combustion engine 14 is provided with an output shaft 34 formed as part of crankshaft 36, which in the cantilever crank design illustrated, has a combination with counter-weight 38 affixed to the output shaft 34 and eccentrically supporting crankshaft pin 40 eccentrically spaced from central axis 18 for reciprocating a conventional piston connecting rod assembly (not shown to better illustrate crank pin 40). The piston reciprocates within cylinder assembly 42 which has an internal cylindrical bore for cooperating with the piston in a finned outer periphery for heat dissipation to the air.

Finned cylinder assembly 42 is oriented in a forward direction extending outward from the center axis to the right of the page as illustrate in FIG. 1. The engine compartment is further provided with a cooling air discharge port 44 in the upper forward portion of housing 12 in order to direct engine cooling air away from the operator carrying the blower vacuum. Immediately below the engine compartment is cooling air pump compartment 30 which is provided with a cooling air outlet 46 which communicates with engine compartment 28. Cooling air pump compartment 30 is defined by a circumaxial wall 48 which extends about center axis 18 and separator wall 50 which divides the engine compartment and cooling air pump compartment of the housing. Separator wall 50 is provided with a cooling air inlet 52 which is relatively close to the central axis 18 compared to cooling air outlet 46. The cooling air pump compartment 30 is generally is pancake shape having a circular outer periphery defined by circumaxial wall 48 and a relatively flat top defined by separator wall 50.

Figure 4:
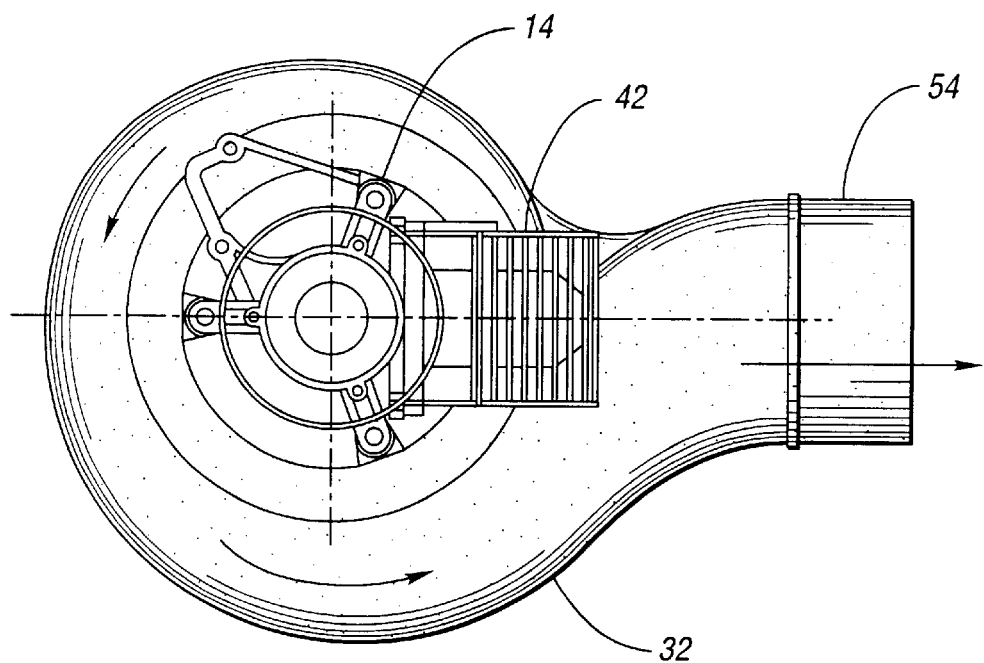
FIG. 4 is a top plan simplified view illustrating the orientation of the engine cylinder and the volute chamber of the housing.
Figure 5:
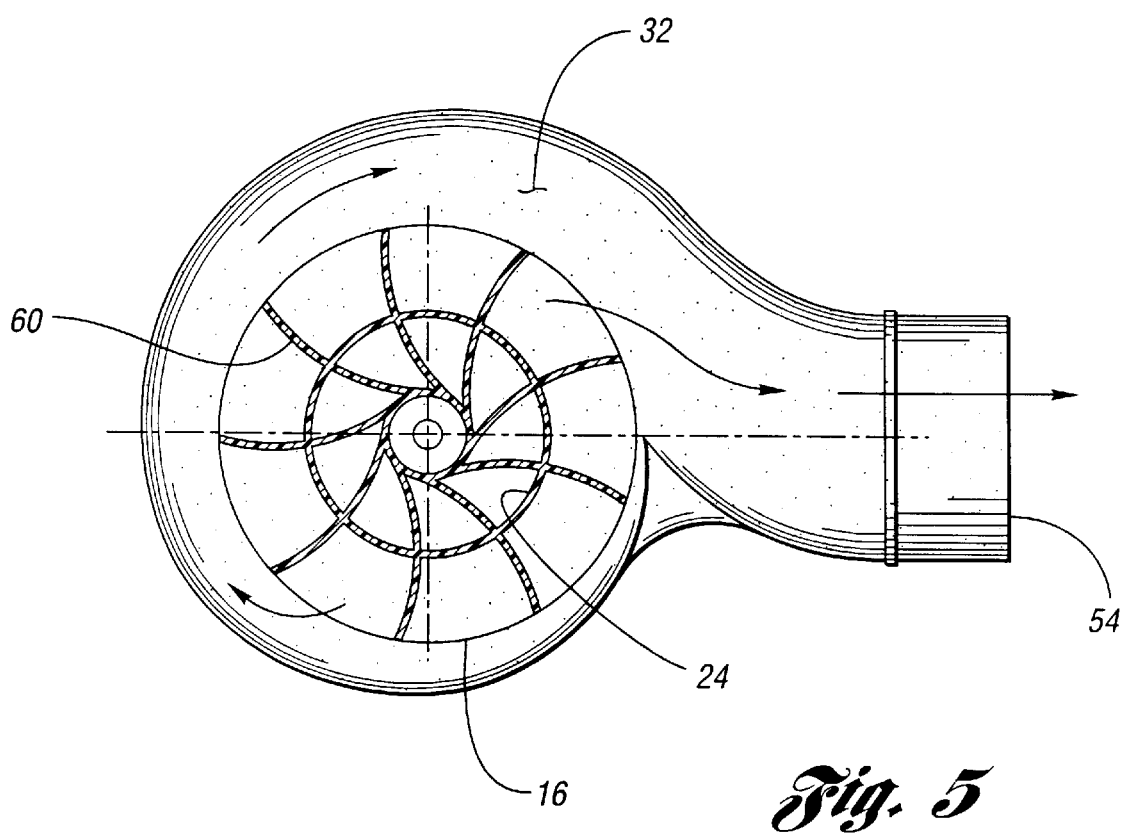
FIG. 5 is a bottom plan schematic view illustrating the orientation of the rotary impeller and the volute chamber of the housing.

Oriented below, cooling air pump compartment 30 is volute chamber 32 which is a conventional volute or helical shape as seen in FIGS. 4 and 5, top and bottom plan views. Volute chamber 32 is provided with a central blower air inlet 24 and a forwarding facing blower air discharge port 54. Once again, forward is defined relative to the blower vacuum as the action in which the blower air discharge port 54 and the engine finned cylinder 42 is oriented. The finned cylinder 42 and the blower air discharge port 54 lie in the previously described blower vacuum central plane.

Rotary impeller 16 is connected to engine output shaft 34 for rotation therewith about central axis 18. Rotary impeller 16 is provided with a plurality of cooling air pump blades 56 which project upwardly from circular disc 58 which acts as a boundary between cooling air pump 30 and volute chamber 32. Rotary impeller 16 is further provided with a plurality of blower fan blades 60 which project downwardly from circular disc 58 into the volute chamber 32. The rotation of the impeller by the engine causes 30 cooling air pump blades 56 to rotate within the cooling air pump compartment drawing air into the compartment through cooling air inlet 52 and discharging cooling air through cooling air outlet 46. Air discharged into the engine compartment blows across the outer periphery of fin cylinder 42. Ultimately the discharge through discharge port 44 in a direction away from the operator in both the blower mode and in the vacuum mode of operation. As impeller 16 rotates, the blower fan blades cause air to be inducted through blower air inlet 24 and discharged through blower air discharge port 54. Impeller 16 rotates counterclockwise in the FIG. 4 top plan view and clockwise in the FIG. 5 bottom plan view causing air to move about the volute chamber 32 as indicated by the directional arrows and discharged in the forward direction as illustrated.

As illustrated in FIG. 1, a blower vacuum of the present invention has a very compact axial height. This results in a relatively low offset between handle 20, the primary handle, and the center line blower air discharge port 54. This squat design results in reduced user wrist and arm fatigue, particularly when operating in the on blower mode illustrated in FIG. 2.

Figure 2:
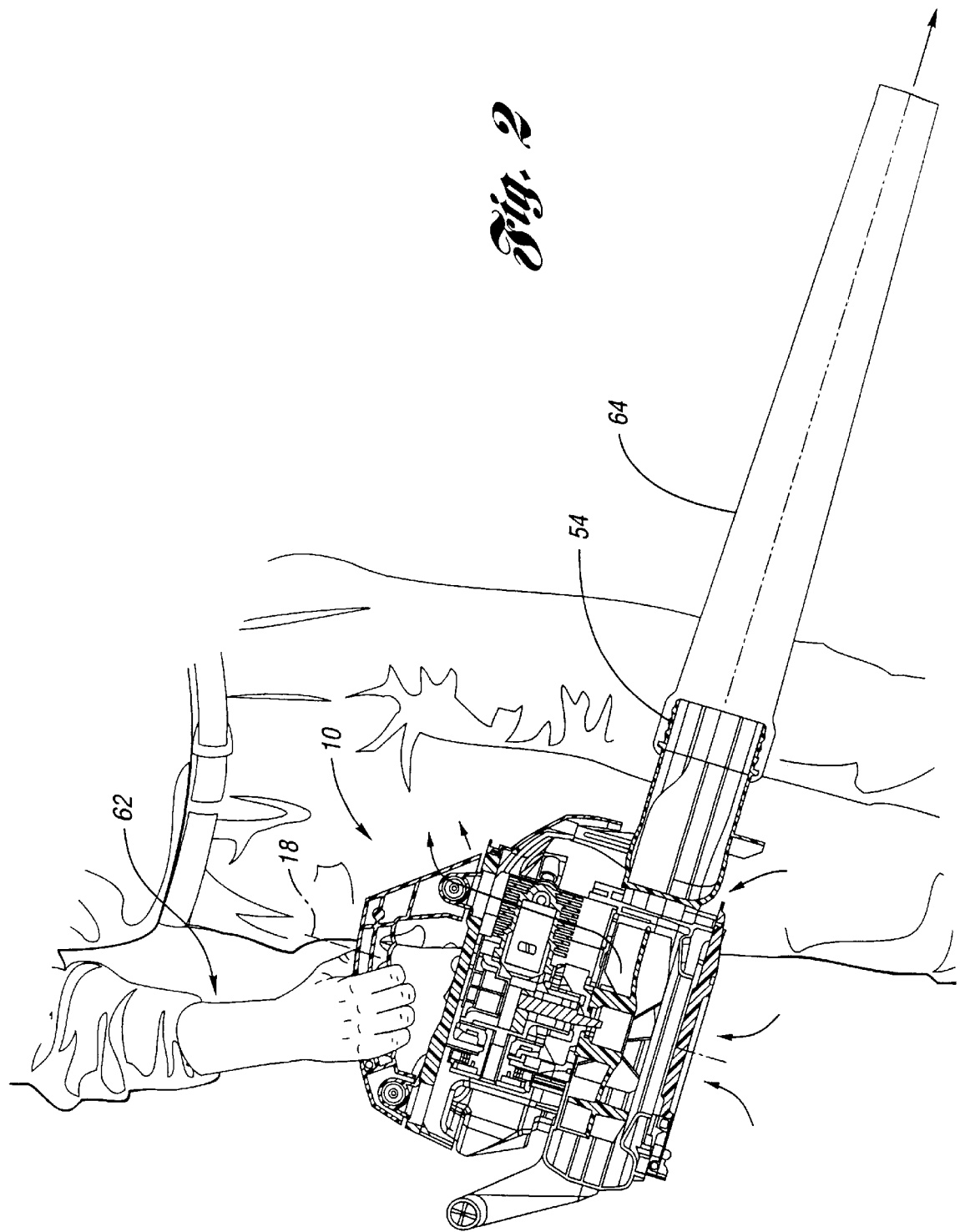
FIG. 2 is an illustration of the blower vacuum being used in the blower mode.

With reference to FIG. 2, the blower vacuum 10 is shown in the blower mode by an operator 62. The blower air discharge port 54 has been equipped with an elongate blower tube 64 in order to enable the user to direct a high speed jet of air against the ground when collecting leaves or other debris. Air enters volute chamber 32 through the blower air inlet to be discharged through blower air discharge port and in turn to the blower tube 64 as illustrated. It should be noted that vertical central axis 18 is slightly forwardly inclined when the blower vacuum is used in the blower mode. The term vertical and forward as used previously and in the appended claims refers to the blower vacuum unit as positioned in FIG. 1.

Figure 3:
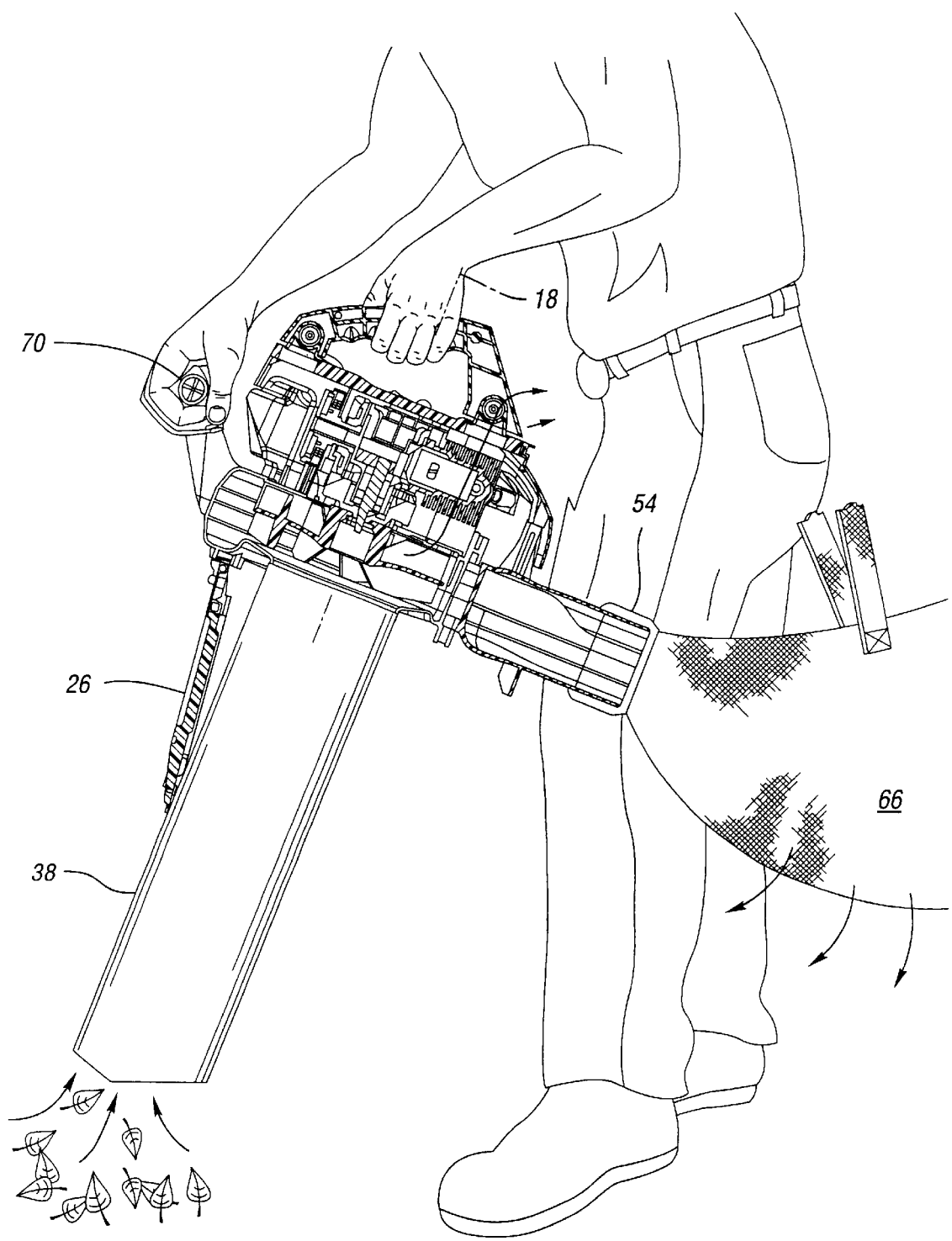
FIG. 3 is a side view of a blower vacuum being used in the vacuum mode.

Blower vacuum 10 as shown in FIG. 3 in the vacuum mode, blower tube 64 has been removed and a debris collecting bag 66 has been attached to the blower air discharge port 54. A vacuum inlet tube 68 is connected to blower air inlet 24 in a conventional manner. In order to connect vacuum tube 68 to the blower air inlet, hinged cover 26 is moved to the open position as illustrated. In the vacuum mode, air is drawn into the volute chamber through inlet tube 68 drawing with the air, leaves and other debris to be collected which is then discharged through blower air discharge port 54 into debris collecting bag 66 formed of a conventional woven material which enables air to escape while retaining therein leaves and other debris. As illustrated in FIG. 3, vertical central axis 18 is inclined slightly rearwardly in typical use. Once again, air is discharged in the forward direction relative to the blower vacuum unit which is discharged into debris collection bag 66 located behind operator 62. Cooling air discharge port 42 directs engine cooling air conveniently away from the operator, behind the operator in a vacuum mode as illustrated in FIG. 3, toward the operator in the blower mode as illustrated in FIG. 2. Preferably, engine cooling air which enters the cooling air inlet 52 of cooling air upper compartment 30 is oriented on the rearward side of the engine adjacent secondary handle 70 in order to reduce the likelihood of ingesting dirt and debris into the cooling air strain. It should be further noted that by positively blowing air across the fin cylinder to remove engine heat, better air velocity and in turn better heat dissipation rates can be achieved as opposed to passing air across the fin cylinder on the inlet side or entering the cooling air inlet 52.

FIGS. 4 and 5 are schematic top and bottom plan views taken along central axis 18 of the volute chamber 32 illustrating the relative orientation of internal combustion engine 14 and rotary impeller 16. Finned cylinder assembly 42 is oriented in the forward direction generally parallel to discharge port 54.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A portable hand-held operator carried blower/vacuum that can alternatively be used in a blower mode and a vacuum mode, comprising:

a housing aligned along a generally vertical central axis and having, a handle formed at an upper portion of the housing and lying in a central plane defined by the central axis and a longitudinal axis which extends generally horizontally fore and aft, and a housing lower surface which has formed therein a blower air inlet aligned with the central axis, the housing defining:

a) an engine compartment having a cooling air discharge port formed in an upper forward portion of the housing;

b) a cooling air pump compartment located below and adjacent to the engine compartment formed by a circumaxial wall extending about the central axis and a separator wall between the engine compartment and the cooling air pump compartment, the cooling air compartment having a cooling air inlet adjacent the central axis and radially spaced apart cooling air outlet in communication with the engine compartment; and c) a volute chamber located below and adjacent to the cooling air pump compartment extending helically about and in communication with the blower air inlet and forming a blower air discharge port oriented in the forward direction;

a internal combustion engine disposed in the engine compartment having an output shaft extending downward into the cooling air pump compartment, and a finned cylinder extending outward from the central axis in the forward direction; and a rotary impeller connected to the engine output shaft having a plurality of cooling air pump blades upwardly projecting from a circular disc which acts as a boundary between the cooling air pump compartment and the volute chamber; and a plurality of blower fan blades projecting downwardly from the circular disc and extending into the volute chamber;

wherein rotation of the impeller by the engine causes air to be drawn into the volute chamber though the blower air inlet and discharged through the blower air discharge port by the blower fan blades while the rotation of the cooling air pump blades causes air to be drawn into the cooling air pump compartment through the cooling air inlet and discharged through the cooling air outlet in order to flow engine cooling air across the finned cylinder of the engine before being exhausted from the engine compartment through the cooling air discharge port in direction away from the operator in both the blower and vacuum modes.

2. The blower vacuum of claim 1 wherein the engine is provided with a cantilever style crankshaft having a crank pin cantileveredly projecting from a counter-weight affixed to the output shaft.

3. The blower vacuum of claim 1 wherein the rotary impeller is a unitary plastic molding in which the cooling air pump blades, the circular disc and the blower fan blades collectively form.

4. The blower vacuum of claim 1 wherein the housing is further provided with an auxiliary handle oriented generally behind the engine compartment extending in a transverse direction normal to the central plane.

5. The blower vacuum of claim 4 wherein the engine compartment is provided with a cooling air port in communication with the cooling air inlet of the cooling air pump compartment.

6. A portable hand-held operator carried blower, comprising:

a housing aligned along a generally vertical central axis and having, a handle formed at an upper portion of the housing and lying in a central plane defined by the central axis and a longitudinal axis which extends generally horizontally fore and aft, and a housing lower surface which has formed therein a blower air inlet aligned with the central axis, the housing defining:

a) an engine compartment having a cooling air discharge port formed in an upper forward portion of the housing;

b) a cooling air pump compartment located below and adjacent to the engine compartment formed by a circumaxial wall extending about the central axis and a separator wall between the engine compartment and the cooling air pump compartment, the cooling air compartment having a cooling air inlet adjacent the central axis and radially spaced apart cooling air outlet in communication with the engine compartment; and c) a volute chamber located below and adjacent to the cooling air pump compartment extending helically about and in communication with the blower air inlet and forming a blower air discharge port oriented in the forward direction;

a internal combustion engine disposed in the engine compartment having an output shaft extending downward into the cooling air pump compartment, and a finned cylinder extending outward from the central axis in the forward direction; and a rotary impeller connected to the engine output shaft having a plurality of cooling air pump blades upwardly projecting from a circular disc which acts as a boundary between the cooling air pump compartment and the volute chamber; and a plurality of blower fan blades projecting downwardly from the circular disc and extending into the volute chamber;

wherein rotation of the impeller by the engine causes air to be drawn into the volute chamber though the blower air inlet and discharged through the blower air discharge port by the blower fan blades while the rotation of the cooling air pump blades causes air to be drawn into the cooling air pump compartment through the cooling air inlet and discharged through the cooling air outlet in order to flow engine cooling air across the finned cylinder of the engine before being exhausted from the engine compartment through the cooling air discharge port in direction away from the operator in both the blower and vacuum modes.

7. The blower vacuum of claim 6 wherein the engine is provided with a cantilever style crankshaft having a crank pin cantileveredly projecting from a counter-weight affixed to the output shaft.

8. The blower vacuum of claim 6 wherein the rotary impeller is a unitary plastic molding in which the cooling air pump blades, the circular disc and the blower fan blades collectively form.

9. The blower vacuum of claim 6 wherein the housing is further provided with an auxiliary handle oriented generally behind the engine compartment extending in a transverse direction normal to the central plane.

10. The blower vacuum of claim 6 wherein the engine compartment is provided with a cooling air port in communication with the cooling air inlet of the cooling air pump compartment.

\* \* \* \* \*